June 7, 1955  I. S. BROCHSTEIN  2,709,946
DISAPPEARING MIRROR SUPPORT CONSTRUCTION
Filed Oct. 30, 1950  2 Sheets-Sheet 1
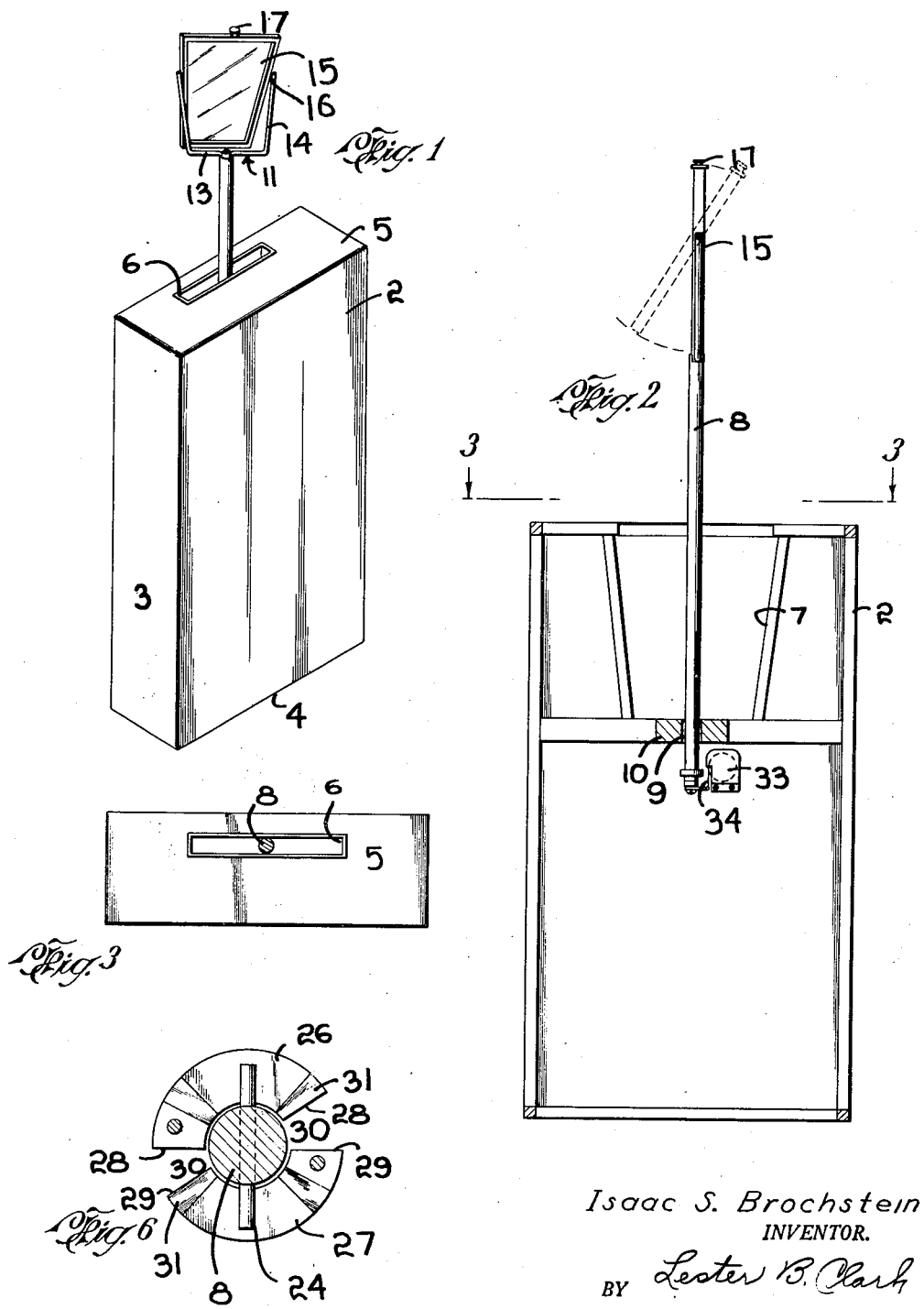
Isaac S. Brochstein
INVENTOR.
BY Lester B. Clark
ATTORNEY June 7, 1955
I. S. BROCHSTEIN
2,709,946
DISAPPEARING MIRROR SUPPORT CONSTRUCTION
Filed Oct. 30, 1950
2 Sheets-Sheet 2
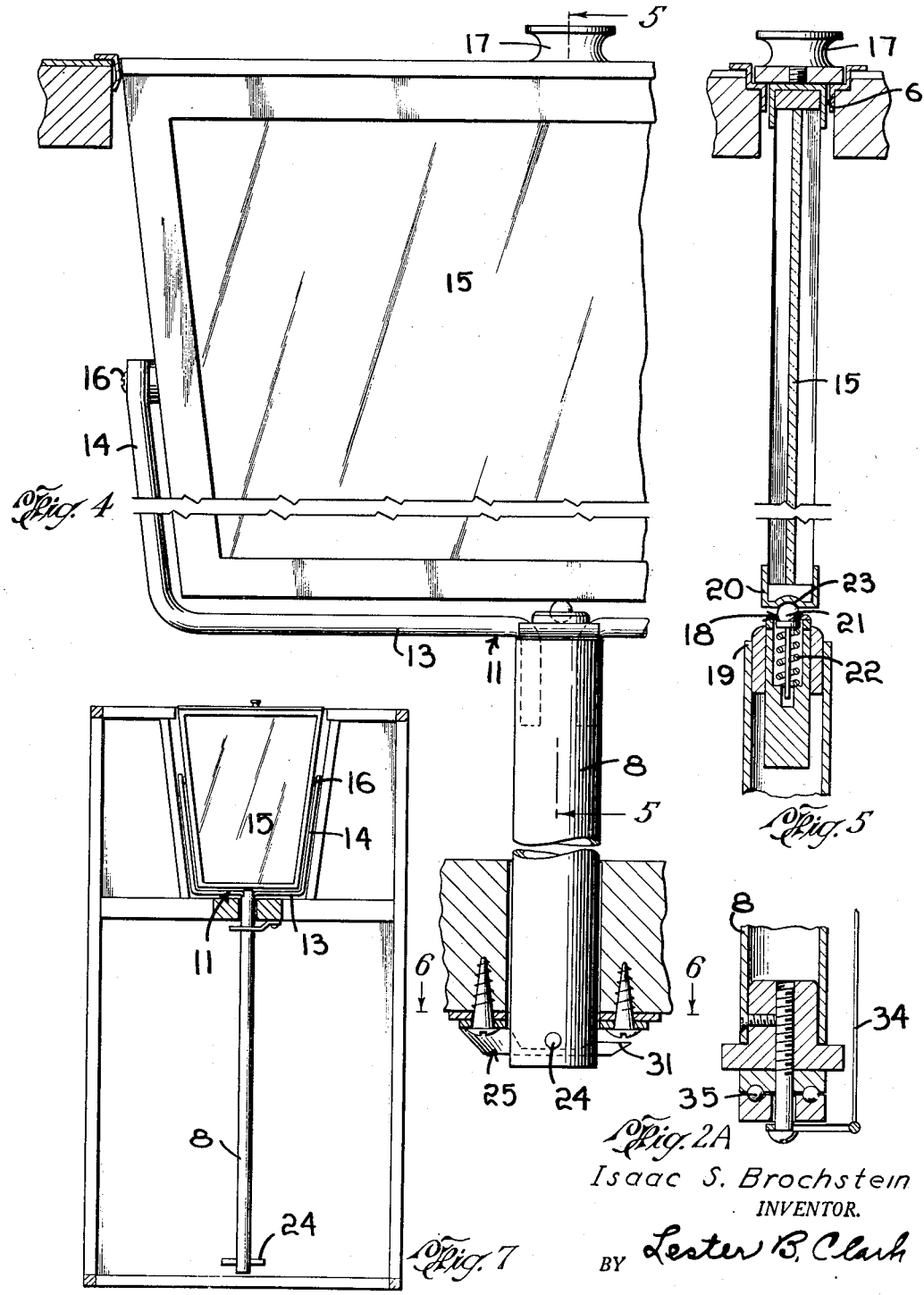
Isaac S. Brochstein
INVENTOR.
BY Lester B. Clark
ATTORNEY

United States Patent Office 2,709,946
Patented June 7, 1955

2,709,946

DISAPPEARING MIRROR SUPPORT CONSTRUCTION

Isaac S. Brochstein, Houston, Tex.

Application October 30, 1950, Serial No. 193,006

7 Claims. (Cl. 88—97)

The invention relates to a mirror support construction and more particularly to a construction wherein the mirror may be moved to an active and inactive position.

An object of the present invention is to provide a mirror support construction adapted to be mounted on counters or the like whereby the mirror can be kept out of the way and out of view when not in use, but which can be readily moved into position for use.

Still another object of the invention is to provide in a mirror support construction a rod with a mirror mounted on one end thereof and means to retain the rod and mirror in an elevated or exposed position.

Still another object of the invention is to provide a mirror support construction including a rod adapted for up and down movement relative to a counter or the like, a mirror mounted on one end thereof and additional means engaged with the other end of the rod whereby said rod may be elevated and supported at any desired position up to its full length to expose the mirror supported thereon.

A still further object of the invention is to provide a mirror support construction adapted to be mounted on a counter or the like including a mirror pivotally mounted on one end thereof, bearing means to rotatably mount said mirror relative to said shaft and additional means to engage the other end of said shaft to support it and the mirror in elevated position.

Other objects and advantages of the invention will become more readily apparent from a consideration of the following description and drawings wherein:

Fig. 1 is a perspective view illustrating one form of the invention;

Fig. 2 is a vertical sectional view showing the mirror mounted on one end of a shaft or rod and the support means to retain the shaft at any desired elevated position out of the housing or counter in which the mirror support is mounted;

Fig. 2A is a vertical sectional view illustrating in detail the support means for the rod or shaft;

Fig. 3 is a top plan view taken on the line 3—3 of Fig. 2;

Fig. 4 is an enlarged partially elevated view of a modification of the invention and more particularly the support means for retaining the shaft or rod in elevated position;

Fig. 5 is a vertical sectional view on the line 5—5 of Fig. 4 showing the mirror in position in the housing or counter in which it is mounted and the abutting means for retaining the mirror aligned with the shaft;

Fig. 6 is a sectional view on the line 6—6 of Fig. 4 showing more clearly the form of the support means for the rod illustrated in Fig. 5;

Fig. 7 is a vertical sectional view partly in elevation showing the mirror support assembled, in accordance with the modification illustrated in Figs. 4 and 6.

In Fig. 1 the invention is shown as being mounted in a housing 2. It seems obvious that in some instances the housing may be dispensed with and the support construction contained therein mounted directly within a counter or the like wherein the invention is to be used. The housing is shown as having side walls 3, bottom and top walls 4 and 5, respectively. The top wall 5 is provided with a slot 6 to receive the mirror as more clearly illustrated in Figs. 5 and 7. In some instances where the housing 2 is dispensed with, the numeral 5 represents the top of the counter or cabinet in which the support construction is to be mounted and the numeral 6 the slot therein to receive the mirror. As shown in Fig. 2 the housing 2 is provided with a compartment 7 to receive the mirror when it is in retracted position as shown in Figs. 5 and 7. The rod or shaft 8 is adapted for longitudinal movement relative to the top 5 of the housing or counter and may be guided in such movement by any suitable means such as the opening 9 in the partition 10 in the bottom of the compartment 7. At one end of the rod or shaft 8 support arms 11 are mounted thereon and extend outwardly and laterally relative to the rod or shaft 8 as illustrated at 13 and thence upwardly at 14 whereby the mirror 15 may be pivotally engaged with each of the arms by means of the pins 16. As shown in Figs. 2 and 7 of the drawings, the pivot pins are horizontally aligned with each other and extend inwardly toward each other from each of said arms. A knob 17 secured on the top of the mirror may be utilized to lift the mirror from its retracted position within the counter or housing and to the position illustrated in Fig. 1.

Suitable means 18 are provided in the upper end 19 of the shaft or rod to abut against the bottom of the mirror frame 20 to retain the mirror in alignment with such rod or shaft; however, it is to be noted that such means preferably consists of a resilient friction engagement whereby the mirror may be tilted as illustrated in Figs. 1 and 2 relative to the longitudinal axis of the shaft or rod 8. One form of such resilient friction engagement means is illustrated in Fig. 5 wherein the ball 21 is urged upwardly by the spring 22 into engagement with the depression 23 in the mirror frame 20. When not in use, the mirror 15 will be in the position illustrated in Figs. 5 and 7. However, if it is desired to use the mirror, it is lifted upwardly to engage the pin 24 at the lower end of the rod or shaft 8 in the support means generally denoted by the numeral 25.

This form of the support means is more clearly illustrated in Fig. 6 as comprising two half washers 26 and 27 mounted in the same horizontal plane with their ends 28 and 29 respectively in spaced relation to provide a groove or passage 30 for the pin 24. As shown in Fig. 6 the half washers encircle the shaft or rod 8 and permit unrestricted upward and downward movement thereof. To position the pin on the half washers the rod is moved upwardly until the pin 24 moves through the passage 30 above the inclined portion 31 of each of the half washers, whereupon rotation of the shaft moves it to the position illustrated in Figs. 4 and 6. The inclined portion 31 on each of the half washers tends to prevent pin 24 from slipping out of engagement with surface 25. When in this position the mirror 15 is exposed above the top 5 of the housing or counter so that it may be used.

In the form of the support means illustrated in Figs. 2 and 2A at 33 a tape 34 is engaged with the lower end of the rod or shaft. This tape is somewhat similar to a steel measuring tape and permits the rod to be moved to any elevation up to its full length and support it at such length while the mirror is being used.

Bearing means 35 are provided whereby the shaft or rod 8 as illustrated in Fig. 2A may be rotated which in turn rotates the mirror to any desired position.

From the foregoing, it seems obvious that a support means for the rod or shaft 8 enables the mirror to be lifted through the slot 6 and retained in an exposed position to enable the use thereof. The support means 33 enables the mirror to be moved to any position out of the housing or counter up to the full length of the rod or shaft 8.

Broadly the invention relates to a mirror support construction and more particularly to a mirror support construction wherein a mirror may be moved from an unexposed to an exposed position to permit the use thereof.

What is claimed is:

1. As an article of furniture, an arrangement for the projection of a mirror from a concealed table top flush position to an elevated position of use above the table top including a mirror, a vertically slidable post rotatable about its vertical axis and depending from and swingably mounting the mirror on a horizontal axis at the upper end of the post, a cabinet structure having in its upper table top face an elongated slot of a width and length substantially corresponding to the thickness and width of the mirror to pass the mirror only when the mirror is adjusted about said horizontal axis and said vertical axis into plane alignment with said slot, a mirror receiving pocket below said top face of a depth to present the top of a pocketed mirror flush with the upper face of the table top of the cabinet, a post bearing support carried by said cabinet structure at the bottom of the pocket for rotatably and slidably mounting said post, and a windup tape assembly mounted in the cabinet structure with its tape end pivotally affixed with the post on a vertical axis to accommodate post rotation when the mirror is projected from its pocket and to support the post in any vertical height at which it is desired to set the mirror.

2. Store furnishing equipment, including a cabinet having a table top, a slot in said table top and a concealed mirror pocket below said slot in said table top, a bearing support in the base of said pocket, a retractable post mounted in and guided by said bearing support for axial sliding and rotation about the longitudinal post axis, a mirror receivable within said pocket to seat on said base with its upper edge flush with the table top, and a pivot mounting between the mirror and the top of the post enabling the mirror to be swung about a horizontal axis when projected from the pocket, said post supporting the projected mirror and by its rotation in its bearing support enabling angular adjustment of the mirror relative to the slot in the table top.

3. The store furnishing equipment of claim 2 wherein a releasable latch holds the swinging mirror in a vertical plane for alignment with the table top slot to insure clear passage of the mirror through the slot incident to sliding adjustment of said post.

4. The store furnishing equipment of claim 2 wherein a windup tape has its free end joined to the slidable post and supports the same in all positions thereof.

5. The store furnishing equipment of claim 4 wherein a pivot connection joins the post and tape to accommodate relative post rotation.

6. The structure of claim 2 wherein a lateral projection is carried by the post and a projection receiving socket is carried adjacent said base of the pocket to retain the post and mirror in projected position.

7. The structure of claim 6 wherein said projection is a pin extended through and on both sides of the post at its lower end and the socket is a pair of half washers extending about said rod in the same horizontal plane but spaced apart at their ends to provide clearance for pin passage to and from pin rest position on said half washers upon rotation of said post.

References Cited in the file of this patent

UNITED STATES PATENTS

| | | |
|---|---|---|
| 878,255 | Thompson | Feb. 4, 1908 |
| 1,262,712 | Stone | Apr. 16, 1918 |
| 1,900,930 | Hauser | Mar. 14, 1933 |
| 2,307,532 | Murphy | Jan. 5, 1943 |
| 2,407,416 | Gudmundson | Sept. 10, 1946 |